Figure 1:
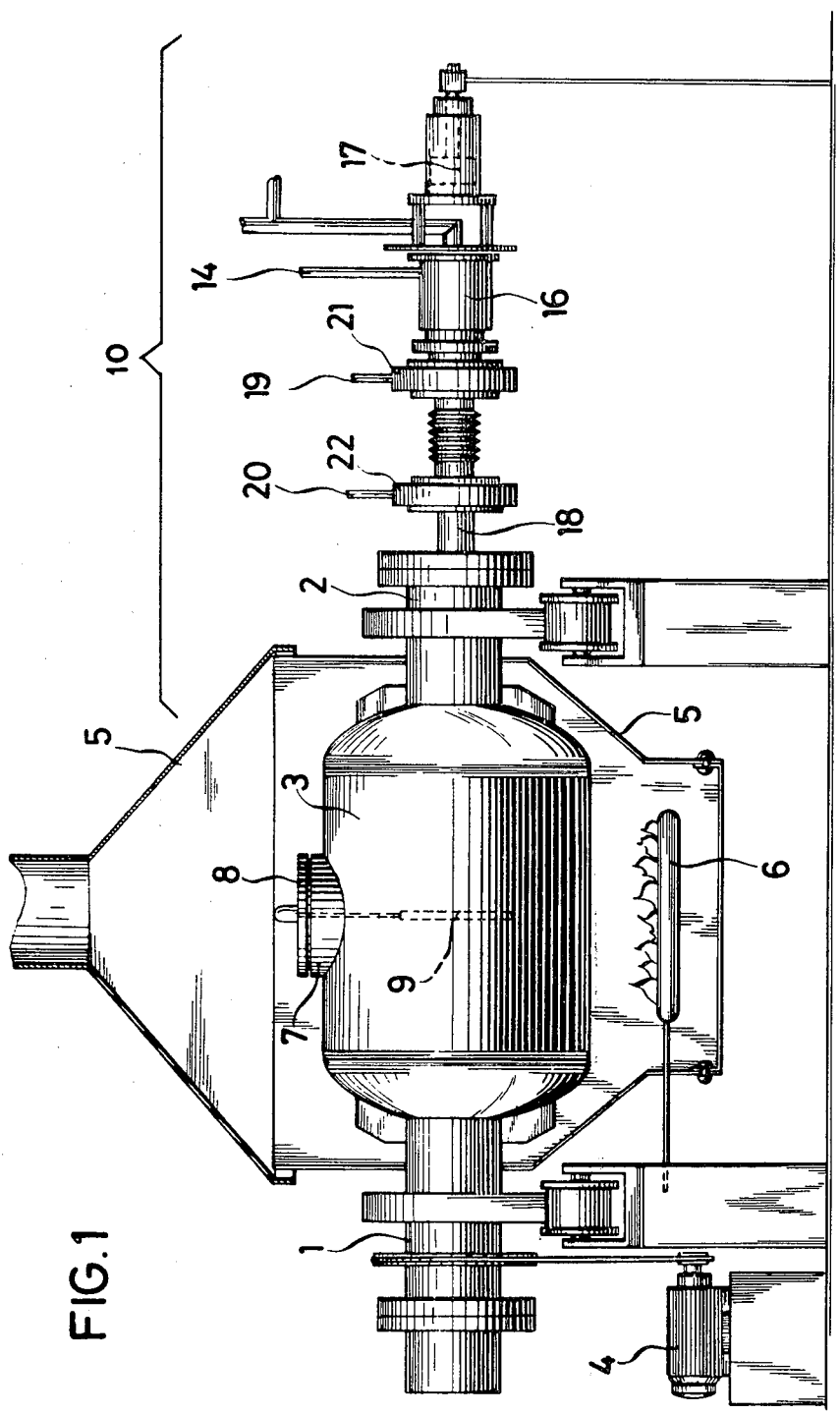

United States Patent [19]

Lehr et al.

[11] 4,330,504
[45] May 18, 1982

[54] APPARATUS FOR MAKING RED PHOSPHORUS

[75] Inventors: Klaus Lehr, Hürth-Knapsack; Gero Heymer, Erftstadt; Hans-Werner Stephan, Cologne; Ursus Thümmler, Erftstadt, all of Fed. Rep. of Germany

[73] Assignee: Hoechst Aktiengesellschaft, Fed. Rep. of Germany

[21] Appl. No.: 226,468

[22] Filed: Jan. 19, 1981

Related U.S. Application Data

[62] Division of Ser. No. 123,106, Feb. 20, 1980, Pat. No. 4,273,752.

[30] Foreign Application Priority Data

Feb. 23, 1979 [DE] Fed. Rep. of Germany ....... 2907059

[51] Int. Cl.³ ........................................... C01B 25/023
[52] U.S. Cl. .................................. 422/205; 422/204; 422/209; 423/322
[58] Field of Search ............... 422/202, 204, 205, 209; 423/322, 323

[56] References Cited

U.S. PATENT DOCUMENTS

| | | | |
|---|---|---|---|
| 1,719,038 | 7/1929 | Wood | 423/322 |
| 2,987,381 | 6/1961 | Carter et al. | 422/209 X |
| 3,111,394 | 11/1963 | Weber et al. | 422/209 X |
| 3,188,171 | 6/1965 | Ghyssaert | 422/209 X |
| 3,207,583 | 9/1965 | Brautigam et al. | 423/322 |
| 3,495,951 | 2/1970 | Tanaka et al. | 422/205 |
| 4,050,897 | 9/1977 | Klein | 422/205 |
| 4,188,367 | 2/1980 | McGilvery | 423/322 |

FOREIGN PATENT DOCUMENTS

| | | |
|---|---|---|
| 520382 | 3/1931 | Fed. Rep. of Germany . |
| 2804340 | 8/1978 | Fed. Rep. of Germany ...... 423/322 |

*Primary Examiner*—Richard L. Chiesa
*Attorney, Agent, or Firm*—Connolly and Hutz

[57] ABSTRACT

The invention relates to an apparatus for making red phosphorus by subjecting molten yellow phosphorus to a thermal conversion reaction in a closed reaction zone. To this end, a hollow shaft-provided and closed ball mill is preheated to a reaction temperature within the range 280° to 590° C. Yellow phosphorus is continuously introduced into the ball mill through the hollow shaft in quantities per unit time which permit the reaction temperature prevailing inside the ball mill to be maintained without supply of heat from the outside. More particularly, decreasing quantities of yellow phosphorous are introduced per unit time at increasing temperature and increasing quantities of yellow phosphorus are introduced per unit time at decreasing temperature within the limits specified. Red phosphorus is allowed to cool inside the ball mill, water is poured over it and the whole is subjected to wet-grinding. An aqueous suspension of red phosphorus is finally removed from the ball mill.

4 Claims, 2 Drawing Figures

APPARATUS FOR MAKING RED PHOSPHORUS

CROSS REFERENCE TO RELATED APPLICATION

This application is a division of application Ser. No. 123,106, filed Feb. 20, 1980, and now U.S. Pat. No. 4,273,752.

The present invention relates to a process for making red phosphorus by subjecting molten yellow phosphorus to a thermal conversion reaction in a closed reaction zone, and to an apparatus for carrying out the present process.

The term "yellow phosphorus" as used herein denotes the white modification and colorless modification of phosphorus.

A process for making red phosphorus by subjecting yellow phosphorus to a thermal conversion reaction in a closed reactor has been described in German Patent Specification "Offenlegungsschrift" No. 2 804 340, wherein fine particulate red phosphorus placed in a reactor is heated therein to temperatures higher than about 250° C. Sprayed onto the bed of red phosphorus, which is heated and continuously agitated in the reactor, is molten yellow phosphorus, and a mixture comprised of yellow and red phosphorus is continuously taken from the reactor, and the mixture is finally freed from yellow phosphorus by evaporation.

An apparatus for use in the production of pulverulent red phosphorus has been described in German Pat. No. 520 382. The apparatus is comprised of a drum which has ball-shaped material placed therein and is provided with two rotatably mounted shafts, of which one is designed as a hollow shaft. The drum is also provided with an opening closable by means of a cover and is rotatably mounted in a closed housing heatable from below by means of furnace gas. The hollow shaft terminates outwardly in a stuffing box in which is rotatably mounted a rigid angled tube dipping in a water-filled container.

The process described hereinabove is however not fully satisfactory inasmuch as the product taken from the container contains at most 95% of red phosphorus, the balance being yellow phosphorus for which it is necessary to be removed by expensive distillative treatment.

The apparatus described hereinabove is also not fully satisfactory. While it enables high percentage red phosphorus to be produced therein, the fact remains that it can be operated discontinuously only, naturally with unsatisfactory space/time-yields.

It is therefore an object of the present invention to provide a process for making almost pure red phosphorus by subjecting yellow phosphorus to a thermal conversion reaction, and an apparatus which can be operated semicontinuously with satisfactory space/time-yields.

The present invention relates more particularly to a process for making red phosphorus by subjecting molten yellow phosphorus to a thermal conversion reaction in a closed reaction zone, which comprises: preheating a closed ball mill provided with at least one hollow shaft to a reaction temperature within the range 280° to 590° C., preferably 340° to 390° C.; continuously introducing yellow phosphorus into the ball mill through the hollow shaft in quantities per unit time permitting the reaction temperature prevailing inside the ball mill to be maintained without supply of heat from the outside, decreasing quantities of yellow phosphorus being introduced per unit time at increasing temperature and increasing quantities of yellow phosphorus being introduced per unit time at decreasing temperature within the limits specified; filling the ball mill with yellow phosphorus to an extent of at most 50% its volume; allowing resulting red phosphorus to cool inside the ball mill; pouring water over it and wet-grindling it; and removing an aqueous suspension of red phosphorus from the reactor.

Preferred features of the present invention provide:

(a) for the ball mill to be evacuated prior to introducing yellow phosphorus thereinto;

(b) for the ball mill to be filled with an inert gas, preferably nitrogen, prior to introducing yellow phosphorus thereinto;

(c) for the ball mill to be filled with iron balls with a diameter within the range 2 to 50 cm;

(d) for the volume of the iron balls to be 0.1 to 20% the volume of the ball mill;

(e) for the phosphorus vapor pressure inside the ball mill to be maintained within the range 1 to 45 bars, depending on the temperature prevailing; and (f) for the phosphorus introduced into the ball mill to be annealed over a period of up to 15 hours, preferably up to 3 hours, at 200° to 590° C. with ball mill rotating.

The apparatus used in accordance with this invention for making red phosphorus by subjecting yellow phosphorus to a thermal conversion reaction comprises: an insulating housing; a drum filled with ball-shaped material and provided with at least two rotatably mounted shafts, of which at least one is a hollow shaft, the cylindrical portion of the drum being formed with an opening closable by means of a cover; the housing surrounding the drum being spaced therefrom; a heating source disposed inside the housing below the drum; and a yellow phosphorus dosing feeder connected to one of the hollow shafts.

Preferred features of the present apparatus provide:

(g) for the dosing means to comprise an angled yellow phosphorus feed pipe formed of two tubular structures of which one receives a dosing rod actuatable by means of a piston, the feed pipe being concentrically surrounded by a first jacket and a second double-walled jacket, the two jackets being spaced from said feed pipe and forming an inner gap and outer gap around said feed pipe, the inner gap being provided with an inlet and the outer gap with an outlet permitting water to be circulated therethrough;

(h) for the inlet and outlet provided in at least one of said gaps to be mounted to stationary collars provided with elastic packing means;

(i) for the feed pipe and a portion of the jacket to be made flexible in axial direction by means of a bellows arranged concentrically with respect to the dosing rod; and (k) for the cover to have a circular shield fixed thereto by means of a stay, the shield being arranged transversely with respect to the axis of the drum, and the center of the shield being approximately in coincidence with the axis of the drum.

In the process of this invention, the reaction zone always has only a very small quantity of yellow phosphorus therein so that the exothermal conversion reaction is substantially not liable to get out of control. By annealing the phosphorus inside the ball mill, after the introduction of yellow phosphorus thereinto has been terminated, it is possible for the quality of the resulting red phosphorus to be improved, and an aqueous suspension of fine particulate red phosphorus is obtained in all those cases in which the ball mill used for effecting the wet grinding operation is filled with ball-shaped material different in diameter.

By structurally modifying a ball mill so as to be suitable for use in the present process for making red phosphorus, it is possible for its capacity to be more than doubled, compared with the capacity of a ball mill in a prior process. This is basically a result of the fact that it is no longer necessary for the ball mill, which is filled with yellow phosphorus, to be heated up to high temperature in wearisome and hazardous manner.

The circular shield forming part of the present apparatus prevents injected yellow phosphorus from impinging upon the opposite frontal surface area of the drum and, after conversion to red phosphorus, from adhering thereto. Needless to say it would be very difficult for the rotating balls to remove such tenaciously adhering red phosphorus.

Figure 2:
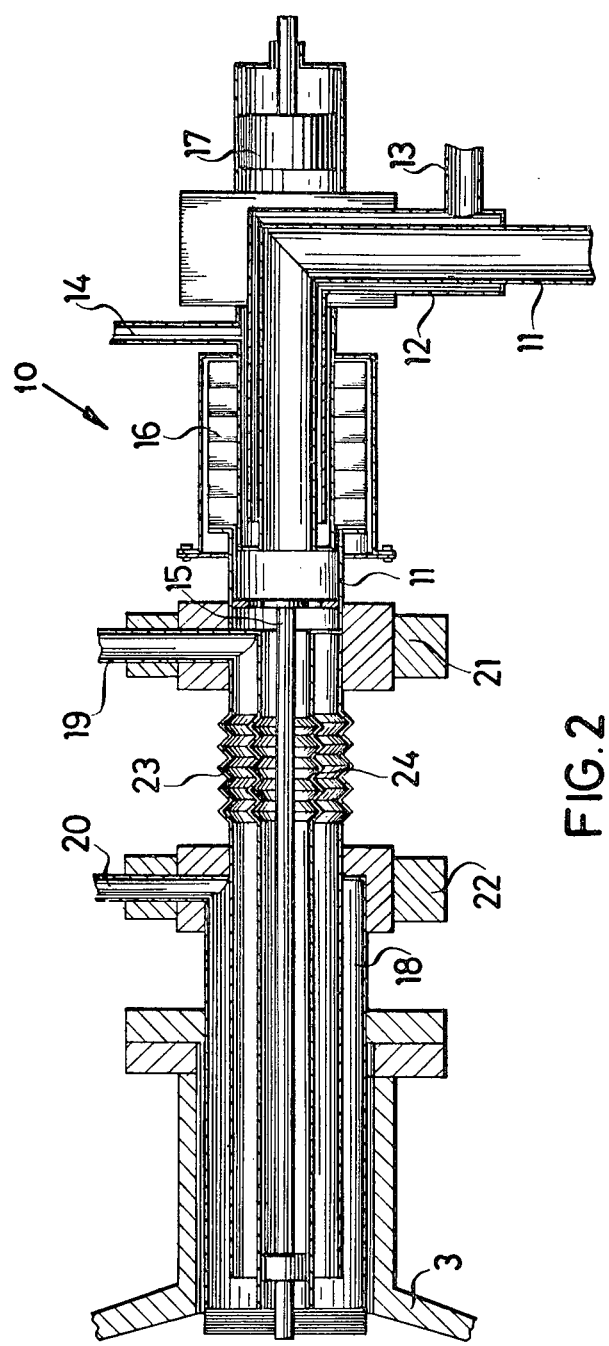

The invention will now be described with reference to the accompanying drawings showing a device for carrying out the present process, diagrammatically and partially in section, of which:

FIG. 1 is a side elevational view of a ball mill provided with a yellow phosphorus dosing feeder and FIG. 2 is an enlarged scale representation of the dosing feeder.

With reference thereto:

A drum 3 filled with ball-shaped material and provided with rotatably mounted hollow shafts (1, 2) is arranged to be driven by a motor 4. The drum 3 is surrounded by an insulating housing 5 and heatable by means of a heating source 6, e.g. a gas burner. The cylindrical portion of the drum 3 is formed with an opening 7 closable by means of a cover 8. Fixed to the cover 8 by means of a stay is a circular shield 9 which is arranged transversely with respect to the drum axis and of which the center is approximately in coincidence with the drum axis.

One of the hollow shafts 1 forming part of the drum 3 is closed, the other 2 having a yellow phosphorus dosing feeder 10 connected thereto. The dosing feeder 10 is comprised of a feed pipe 11 which is surrounded by a first jacket 12 provided with an inlet 13 and an outlet 14. Circulated through the jacket 12 is warm water of 60° C. The feed pipe 11 has a dosing rod 15 installed therein. Yellow phosphorus is introduced into the drum 3 through a stuffing box 16 with the dosing rod 15 being in open position. The dosing rod is actuated by means of a pneumatically or hydraulically actuated piston 17, two bellows (23, 24) compensating the strokes of the dosing rod 15.

Disposed around that portion of feed pipe 11 which is nearer drum 3 is a second jacket 18 provided with an inlet 19 and an outlet 20. The latter (19, 20) are mounted in stationary brass collars (21, 22), respectively, the collars being sealed by means of O-shaped packing rings to permit warm water circulation in jacket 18.

EXAMPLE 1

Use was made of a ball mill which had a volume of 104 l and was provided with a dosing feeder. The ball mill which had 65 iron balls with a diameter within the range 5 to 10 cm placed therein was scavenged with nitrogen, closed and heated to 360° C. Next, 50 kg of molten yellow phosphorus was introduced in metered portions within 70 minutes into the ball mill inside which the pressure rose from 1.5 to 6.5 bars. After all had been introduced, the whole was heat-treated for a further 30 minutes at 360° C. with ball mill rotating. Next, the whole was allowed to cool down to room temperature within 9 hours with ball mill rotating. The ball mill was then opened and completely filled with water. After this had been done, the ball mill was closed once again and the material therein was subjected to wet-grinding over 2 hours. 99.5% of the solid matter in the suspension finally taken from the ball mill was red phosphorus.

EXAMPLE 2

Use was made of a ball mill which had a volume of 5 m$^3$ and was provided with a dosing feeder. The ball mill which had 3700 kg of iron balls with a diameter within the range 2 to 20 cm placed therein, was scavenged with nitrogen, closed and heated to 350° C. Next, 2000 kg of molten yellow phosphorus was introduced within 3 hours into the ball mill in portions per unit time which permitted the 350° C. temperature prevailing in the ball mill to be practically maintained. During the introduction of yellow phosphorus into the ball mill, the pressure prevailing therein rose from 1.5 to 7.0 bars. After all had been introduced, the whole was heat-treated for a further 2 hours at 350° C. with ball mill rotating. Next, the whole was allowed to cool down to room temperature within 10 hours with ball mill rotating. The ball mill was opened, filled with water up to 75% its volume, closed again and the material therein was subjected to wet grinding over 2 hours. 99.8% of the solid matter in the suspension finally taken from the ball mill was red phosphorus.

We claim:

1. An apparatus for making red phosphorus by subjecting yellow phosphorus to a thermal conversion reaction which comprises: an insulating housing; a drum having a cylindrical portion and two vaulted end portions being filled with ball-shaped material; two rotatably mounted shafts secured to said end portions, at least one of said shafts being a hollow shaft; said cylindrical portion being formed with an opening closable by means of a cover; the housing surrounding the drum and spaced therefrom; a heating source disposed inside the housing below the drum; a yellow phosphorus dosing feeder connected to one of the hollow shafts, said dosing feeder being comprised of an angled yellow phosphorus feed pipe formed of two tubular structures of which one receives a dosing rod actuatable by means of a piston, the feed pipe being concentrically surrounded by a first jacket and a second double-walled jacket, the two jackets being spaced from said feed pipe and forming an inner gap and outer gap around said feed pipe; the inner gap being provided with an inlet and the outer gap with an outlet permitting water to be circulated therethorough.

2. The apparatus as claimed in claim 1, wherein the inlet and outlet provided in at least one of said gaps is mounted in stationary collars, provided with elastic packing means.

3. The apparatus as claimed in claim 1, wherein the feed pipe and a portion of the jacket are made flexible in axial direction by means of a bellows arranged concentrically with respect to the dosing rod.

4. The apparatus as claimed in claim 1, wherein the cover has a circular shield fixed thereto by means of a stay, the shield being arranged transversely with respect to the axis of the drum and the center of the shield being approximately in coincidence with the axis of the drum.

* * * * *